United States Patent
Hatscher et al.

(10) Patent No.: US 8,236,264 B2
(45) Date of Patent: Aug. 7, 2012

(54) ADSORPTION COMPOSITION AND PROCESS FOR REMOVING CO FROM MATERIAL STREAMS

(75) Inventors: Stephan Hatscher, Syke (DE); Michael Hesse, Worms (DE)

(73) Assignee: BASF SE, Ludwigshafen (DE)

(*) Notice: Subject to any disclaimer, the term of this patent is extended or adjusted under 35 U.S.C. 154(b) by 291 days.

(21) Appl. No.: 12/515,246

(22) PCT Filed: Nov. 28, 2007

(86) PCT No.: PCT/EP2007/062937
§ 371 (c)(1),
(2), (4) Date: May 15, 2009

(87) PCT Pub. No.: WO2008/065135
PCT Pub. Date: Jun. 5, 2008

(65) Prior Publication Data
US 2009/0301301 A1 Dec. 10, 2009

(30) Foreign Application Priority Data
Dec. 1, 2006 (EP) .................... 06125244

(51) Int. Cl.
*B01D 53/86* (2006.01)
*B01J 20/06* (2006.01)
*B01J 23/72* (2006.01)
(52) U.S. Cl. .................... 423/247; 423/437.2; 423/656; 502/345; 585/820
(58) Field of Classification Search .................. 96/108; 95/140; 423/246, 247, 604, 437.1, 437.2, 423/656; 502/20, 345, 346; 585/820, 826
See application file for complete search history.

(56) References Cited

U.S. PATENT DOCUMENTS

| | | | |
|---|---|---|---|
| 3,549,719 A | 12/1970 | Duyverman et al. | |
| 3,676,516 A | 7/1972 | Haskell et al. | |
| 4,172,053 A * | 10/1979 | Vogt et al. .......... | 502/84 |
| 4,233,180 A * | 11/1980 | Hausberger et al. .......... | 252/373 |
| 4,552,861 A | 11/1985 | Courty et al. | |
| 4,593,148 A | 6/1986 | Johnson et al. | |
| 4,713,090 A | 12/1987 | Yokoe et al. | |
| 4,780,481 A | 10/1988 | Courty et al. | |
| 4,835,132 A | 5/1989 | Sambrook | |
| 4,871,710 A | 10/1989 | Denny et al. | |
| 4,917,711 A | 4/1990 | Xie et al. | |
| 5,175,137 A * | 12/1992 | Golden et al. .......... | 502/417 |
| 5,328,672 A | 7/1994 | Montreuil et al. | |
| 6,238,640 B1 | 5/2001 | Eguchi et al. | |
| 6,524,996 B1 | 2/2003 | Bender et al. | |
| 6,723,295 B1 | 4/2004 | Baier et al. | |
| 6,888,011 B2 | 5/2005 | Borchert et al. | |
| 7,314,965 B2 | 1/2008 | Vorberg et al. | |
| 7,435,285 B2 | 10/2008 | Junicke et al. | |
| 7,781,368 B2 * | 8/2010 | Schlitter et al. .......... | 502/400 |
| 7,884,048 B2 * | 2/2011 | Schlitter et al. .......... | 502/400 |
| 2005/0241478 A1 * | 11/2005 | Junicke et al. .......... | 95/140 |

FOREIGN PATENT DOCUMENTS

| | | |
|---|---|---|
| CA | 2045060 | 1/1992 |
| DD | 153761 | 2/1982 |
| DE | 1929977 | 12/1969 |
| DE | 19848595 | 4/2000 |
| DE | 19950325 | 4/2001 |
| DE | 19963441 | 7/2001 |
| DE | 10241529 | 3/2004 |
| EP | 0296734 | 12/1988 |
| EP | 0434062 | 6/1991 |
| EP | 0537628 | 4/1993 |
| EP | 0662595 | 7/1995 |
| EP | 0750933 | 1/1997 |
| EP | 0804959 | 11/1997 |
| EP | 0820960 | 1/1998 |
| JP | 55003856 | 1/1980 |
| JP | 2144125 | 6/1990 |
| JP | 5337363 | 12/1993 |
| WO | WO-9521146 | 8/1995 |
| WO | WO-9523644 | 9/1995 |
| WO | WO-9614280 | 5/1996 |
| WO | WO-9841597 | 9/1998 |
| WO | WO-0107383 | 2/2001 |
| WO | WO-0206619 | 1/2002 |
| WO | WO-0247818 | 6/2002 |
| WO | WO-02068119 | 9/2002 |
| WO | WO-02094435 | 11/2002 |
| WO | WO-03002252 | 1/2003 |
| WO | WO-03051493 | 6/2003 |
| WO | WO-2004022223 | 3/2004 |
| WO | WO-2007093526 | 8/2007 |
| WO | WO-2007093532 | 8/2007 |
| WO | WO-2007147783 | 12/2007 |

OTHER PUBLICATIONS

English-language Translation of the International Preliminary Report on Patentability of international application PCT/EP2007/062937, mailed Jul. 16, 2009.
Huang et al., "CO oxidation behavior of copper and copper oxides", Catalysis Letters, vol. 87, Nos. 3-4, Apr. 2003, pp. 173-178.
Naumann d'Alnoncourt et al., "The coverage-dependent adsorption of carbon monoxide on hydrogen-reduced copper catalysts: the combined application of microcalorimetry, temperature-programmed desorption and FTIR spectroscopy", Thermochimica Acta, vol. 434, 2005, pp. 132-139, (available online Feb. 16, 2005).
Ko et al., "Cu-ZrO$_2$ catalysts for water-gas-shift reaction at low temperatures", Catalysis Letters, vol. 105, Nos. 3-4, Dec. 2005, pp. 157-161.

* cited by examiner

*Primary Examiner* — Frank Lawrence, Jr.
(74) *Attorney, Agent, or Firm* — Connolly Bove Lodge & Hutz LLP

(57) ABSTRACT

Carbon monoxide is removed from material streams by adsorption to an adsorption composition comprising oxides of copper, zinc and aluminum, the copper-comprising fraction of which has a degree of reduction, expressed as weight ratio of metallic copper to the sum of metallic copper and copper oxides, calculated as CuO, of at most 60%.

20 Claims, No Drawings

ADSORPTION COMPOSITION AND PROCESS FOR REMOVING CO FROM MATERIAL STREAMS

CROSS REFERENCE TO RELATED APPLICATIONS

This application is a National Stage of PCT/EP2007/062937 filed Nov. 28, 2007, which in turn claims priority from European Application 06125244.1 filed Dec. 1, 2006, the entire contents of which are incorporated herein by reference.

The present invention relates to an adsorption composition and a process for removing CO from material streams. In particular, the invention relates to an adsorption composition and a process for removing carbon monoxide from hydrocarbon streams.

In various sectors of industry it is important to have particularly pure material streams available. "Pure" in this context means that the material steam is free from components which interfere with the proper use of the material stream. One example is breathing air which must be free from toxic compounds. Likewise, for instance in the production of electronic components, pure material streams are required so that there is no carry over of contamination which impairs the electronic properties of the components produced, inter alia, in this case particularly pure nitrogen or particularly pure argon are frequently required as protective gas. Another example is catalytic chemical reactions. Catalysts are frequently very sensitive to poisoning. Since, for economic reasons, customarily attempts are made to maximize the feed material stream per unit volume or mass of the catalyst, even extraordinary small amounts of impurities in the feed material stream can collect on the catalyst and poison it. Typically, for olefin polymerization reactions in the presence of modern catalysts, for example metallocene catalysts, olefin streams are required which comprise no more than a few ppb (parts per billion, that is to say $10^{-9}$ parts of impurities per part of the desired substance) ("polymer grade" olefins). Olefins originating from typical olefin sources (steam crackers, fluid catalytic crackers, dehydrogenations, MTO processes ("methanol to olefins")) usually comprise very much higher fractions (ppm or even parts per thousand range) of impurities such as carbon monoxide or oxygen ("chemical grade"); these fractions must be correspondingly lowered before use for polymerization.

Typically, the material streams to be purified are air, nitrogen or argon, or hydrocarbons such as ethylene, propylene, 1-butene, 2-butene, 1,3-butadiene or styrene. Typical impurities which must generally be removed are oxygen and carbon monoxide, and frequently also water, carbon dioxide, hydrogen, or else compounds of sulfur, arsenic or antimony. Processes for removing such impurities from material streams are known.

The best known is removing carbon monoxide from oxygen-comprising gas streams, for example from breathing air. This is usually achieved by catalytic reaction of carbon monoxide with oxygen, generally in the presence of copper-comprising catalysts. The most-used catalyst of this reaction is hopcalite, a copper-manganese mixed oxide very highly active for reacting carbon monoxide with oxygen, originally developed for removing CO from breathing air in breathing masks, in the presence of which the highly toxic carbon monoxide reacts with oxygen to form carbon dioxide.

However, other uses of hopcalite and processes for purifying material streams other than breathing air are also known. For instance WO 98/041 597 A1 discloses a process for removing alkynes, monounsaturated or polyunsaturated hydrocarbons, compounds of sulfur, antimony or arsenic, oxygen, hydrogen and carbon monoxide from material streams by a sequence of two or three defined catalytic and absorptive process steps. EP 662 595 A1 teaches a process for removing hydrogen, carbon monoxide and oxygen from cold liquid nitrogen by contacting with defined zeolites or other metal oxides, in particular hopcalite. EP 750 933 A1 discloses a similar process for removing oxygen and carbon monoxide from cold nitrogen or cold noble gases by contacting with metal oxides, in particular hopcalite. However, at the low temperatures employed below –40° C., no, or only very little, catalytic reaction takes place, oxygen and carbon monoxide are absorbed to the hopcalite and only react at a high temperature, unless they are removed in the cold in a desorption step. EP 820 960 A1 discloses a process for removing oxygen and carbon monoxide from nitrogen or noble gases by contacting with metal oxides such as hopcalite, in particular at temperatures of 5 to 50° C.

T.-J Huang and D.-H. Tsai, Catalysis Letters 87 (2003) 173-178 report on the effect of the oxidation state of copper on the oxidation of carbon monoxide. $Cu_2O$ is overall more active than CuO, which is due to the higher motility of oxygen in $Cu_2O$, compared with Cu or CuO.

WO 02/094 435 A1 teaches a process for the oxidative removal of CO from ethylene at temperatures in the range from 70 to 110° C. in the presence of copper- and zinc-comprising post-calcined copper(oxide)-, zinc oxide- and aluminum oxide-comprising catalysts. WO 02/47818 A1 discloses a process for the hydrogenation of maleic anhydride in the presence of such catalysts.

WO 02/026 619 A2 discloses a process for removing carbon monoxide by water gas shift reaction and WO 03/051 493 A2 discloses a process for the selective oxidation of carbon monoxide, in each case in gas streams which comprise carbon monoxide, oxygen and hydrogen, in particular in fuel cells, and in each case in the presence of catalysts which comprise copper, a metal of the platinum group and a reducible metal oxide on an oxidic support of activated aluminum, zirconium dioxide, titanium dioxide, silicon dioxide, zeolites or combinations thereof. The reducible metal oxide is selected from the group of oxides of Cr, V, Mo, Ce, Pr, Nd, Ti, Ni, Mn, Co and combinations thereof. U.S. Pat. No. 6,238,640 B1 describes a process for removing carbon monoxide from hydrogen-comprising gas streams by reaction with steam and oxygen to form carbon dioxide and hydrogen in the presence of a catalyst which comprises copper oxide and aluminum oxide and also at least one metal oxide from the group formed by zinc oxide, chromium oxide and magnesium oxide.

In these processes for removing carbon monoxide in the presence of oxygen by reaction thereof, carbon dioxide is formed. In subsequent processes this can be inert or even be an interfering impurity. In the latter case it is removed, and various processes are also known for this. For example, CA 2 045 060 A1 teaches a process for removing carbon monoxide, carbon dioxide, hydrogen, oxygen and water vapor from inert gas streams at a temperature in the range from –30° C. to +40° C., in particular from –30° C. and 0° C., with carbon monoxide being reacted at transition metal oxides such as hopcalite or copper cobalt oxide to give carbon dioxide and the latter being removed by adsorption to copper on an aluminum oxide support, or nickel on an aluminum oxide or silicon dioxide support.

In some applications, however, carbon monoxide must be removed in another way than by reaction with oxygen or water, for example when, although carbon monoxide is present, no oxygen, no water or only a stoichiometric deficit thereof is present in the material stream to be purified. In some applications, oxygen must be removed before the carbon monoxide, in particular when, in addition to the formation of carbon dioxide, other interfering byproducts can also be formed. For example, when the removal of oxygen and carbon monoxide in the presence of copper-comprising catalysts from liquid hydrocarbons such as propylene, butene, butadiene or styrene, oxidation products of the hydrocarbon are also formed (what are termed "oxygenated hydrocarbons"), which are themselves interfering impurities. In such cases the oxygen must be removed before removal of the carbon monoxide, and carbon monoxide cannot be removed by oxidation.

In such cases, carbon monoxide is therefore customarily removed by distillation, but it is not possible thereby to remove CO down to residual contents in the ppb range. Adsorptive processes and adsorbents for purifying material streams, however, are also known. German laid-open application DE 1 929 977 teaches catalysts comprising 20 to 60 parts of CuO on 100 parts of ZnO and use thereof for removing CO from ethylene and propylene streams at a temperature in the range from 50 to 200° C. U.S. Pat. No. 3,676,516 teaches a supported Cu catalyst, 20 to 95% of the copper of which is present as $Cu^{2+}$, and use thereof for removing CO from ethylene or propylene streams at a temperature below approximately 200° C., in the examples specifically around 93° C. U.S. Pat. No. 4,917,711 discloses an adsorbent which comprises a copper compound on a high surface area support, but olefins are also adsorbed and is therefore only suitable for purifying nitrogen, noble gases and saturated hydrocarbons. WO 01/007 383 A1 teaches a process for purifying olefin streams by passing them over porous adsorbents such as carbon black or aluminum oxide and/or silicon oxide. JP 02 144 125 A2 (CAS Abstract 113:177 506) teaches a process for removing carbon monoxide and metal carbonyls from the exhaust gases formed in semiconductor manufacture by adsorption compositions comprising manganese oxide and copper oxide. JP 05 337 363 A2 (CAS Abstract 120:274 461) discloses adsorbents for carbon monoxide removal which comprise palladium and further oxides on a support, the oxides being selected from the oxides of elements of groups 11, 2 and 12 (without Be, Cd, Hg and Ra), 13 (without Al, TI and the actinides), 14 (without C, Si, Pb and Hf), 5 and 15 (without N, P, As and the "Pa series"), 6 and 16 (without O, S, Se and U), 7 and 8 of the Periodic Table of the Elements. WO 95/021 146 A1 teaches a process for removing carbon monoxide and, where present, also arsine, from liquid hydrocarbon streams by contacting them with a sorbent which, depending on the embodiment, comprises dispersed copper in the oxidation states 0, +1 or +2, and in certain cases, also, manganese dioxide. EP 537 628 A1 discloses a process for removing carbon monoxide from alpha-olefins and saturated hydrocarbons by contacting them with a catalyst system based on at least one oxide of a metal selected from Cu, Fe, Ni, Co, Pt and Pd and at least one oxide of a metal selected from one of the groups 5, 6 or 7 of the Periodic Table of the Elements at 0 to 150° C. U.S. Pat. No. 4,713,090 describes an adsorbent for obtaining high-purity carbon monoxide by pressure- or temperature-swing adsorption. The adsorbent comprises a composite support having a core of silicon oxide or aluminum oxide and an outer layer of an activated carbon on which a copper compound is supported.

WO 2004/022 223 A2 teaches an adsorption composition comprising copper, zinc, zirconium and optionally aluminum and use thereof for removing CO from material streams in a completely reduced state.

Copper-comprising catalysts are also known for applications other than for removing CO from inert gases or hydrocarbons. U.S. Pat. No. 4,593,148 and U.S. Pat. No. 4,871,710 disclose Cu/Zn catalysts for desulfurization and dearsenization. WO 95/023 644 A1 teaches a copper catalyst for the hydrogenation of carbon oxides, for example to methanol, or for what is termed the shift reaction of carbon monoxide with water to carbon dioxide and hydrogen which, in addition to dispersed copper, also comprises stabilizers such as silicon dioxide, aluminum oxide, chromium oxide, magnesium oxide and/or zinc oxide and optionally also a support such as aluminum oxide, zirconium dioxide, magnesium oxide and/or silicon dioxide, and its activation and passivation. DE 198 48 595 A1 discloses a catalyst for decomposition of laughing gas, which catalyst has the general formula $M_xAl_2O_4$, where M is Cu or a mixture of Cu and Zn and/or Mg and can comprise further dopings, in particular Zr and/or La. U.S. Pat. No. 5,328,672 teaches an automotive exhaust gas purification catalyst which comprises a transition metal-comprising oxide and a transition metal-comprising zeolite, the transition metal being selected from Cu, Co, Ni, Cr, Fe, Mn, Ag, Zn, Ca and "compatible mixtures thereof", preferably being identical in oxide and zeolite, and particularly preferably being Cu and the oxide being selected from oxides of La, Ti, Si, Zr and preferably being $ZrO_2$. EP 804 959 A1 discloses an $NO_x$ decomposition catalyst which, in addition to copper and an MFI zeolite, can also comprise $SiO_2$, $Al_2O_3$, $SiO_2/Al_2O_3$, MgO, $ZrO_2$ and the like, and also any desired further elements such as the transition elements Pt, Rh, Cr, Co, Y, Zr, V, Mn, Fe and Zn, and also Ga, In, Sn, Pb, P, Sb, Mg and Ba, preferably P. DE 199 50 325 A1 teaches a spinel monolith catalyst for $NO_x$ decomposition having the general formula $A_xB_{(1-x)}E_2O_4$, where A is Cu, half of which can be replaced by Co, Fe, Ni, Mn or Cr; B is at least one element selected from Zn, Mg, Ca, Zr, Ce, Sn, Ti, V, Mo and W, and E is Al, half of which can be replaced by Fe, Cr, Ga, La or mixtures thereof. U.S. Pat. No. 4,552,861 teaches a production process for catalysts which comprise Cu, Zn, Al and at least one element from the group formed by the rare earths and zirconium, and also use thereof for methanol synthesis. The methanol catalysts disclosed in U.S. Pat. No. 4,780,481 comprise Cu, Zn and at least one alkali metal or alkaline earth metal, noble metals and/or rare earths, with Zn being able to be partly replaced by Zr. WO 96/014 280 A1 teaches catalysts which comprise Cu, Zn and at least one compound of Al, Zr, Mg, a rare earth metal and/or mixtures thereof and use thereof for the hydrogenation of carboxylic esters. EP 434 062 A1 likewise teaches a process for the hydrogenation of carboxylic esters in the presence of a catalyst comprising Cu, Al and a metal selected from the group formed by Mg, Zn, Ti, Zr, Sn, Ni, Co and mixtures thereof. U.S. Pat. No. 4,835,132 describes CO shift catalysts which are generated from a precursor of the formula $(Cu+Zn)_6Al_xR_y(CO_3)_{(x+y)/2}OH_{12+2(x+y)} \cdot nH_2O$ having a layered structure by calcination, with R being La, Ce or Zr, x at least 1 and at most 4, y at least 0.01 and at most 1.5 and n being approximately 4.

Processes are also known to activate, reactivate or passivate the transport catalysts, including copper-comprising catalysts. The patent publication DD 0 153 761 relates to a process for activating or reactivating iron molybdate redox catalysts which can also comprise copper, the catalysts first being calcined in a non-oxidizing atmosphere and then brought into contact with an oxidizing gas. DE 199 63 441 A1 teaches a process for regenerating copper-comprising hydrogenation catalysts gases by firstly an oxidizing treatment and then a reducing treatment, the reduction preferably first being carried out in the hydrogenation reactor. WO 02/068 119 A1 discloses copper-comprising hydrogenation and dehydrogenation catalysts which are used in the reduced state and are passivated for transport by partial oxidation of the copper. EP 296 734 A1 describes copper-comprising shift catalysts or methanol catalysts which, through reduction at a temperature below 250° C., have a Cu surface area of at least 70 m²/g, based on copper. Such activation, regeneration and passivation processes are also known for other catalysts, thus, for instance JP 55/003 856 A (WPI-Abstract No. WP198013664C) discloses a process for activating palladium-based catalysts by reduction with methanol, oxidation with oxygen, then with an acetic acid and oxygen, and subsequent reduction with hydrogen. WO 03/002 252 A1 describes an activation process for a cobalt-comprising catalyst by treatment with hydrocarbon.

The European patent applications having the file numbers 06101648.1 and 06101654.9 describe adsorption compositions comprising copper, zinc and zirconium in various reduction states and their use for removing carbon monoxide from material streams.

The increase in purity requirements of material streams for some application fields, however, require novel and improved auxiliaries and processes for removing impurities. A problem in particular is the removal of carbon monoxide from hydrocarbons and there, particularly from hydrocarbons typically present in liquid form such as propene, 1- or 2-butene. The object of this invention, therefore, is to find an improved adsorption medium and an improved process for removal of carbon monoxide from material streams by adsorption.

Accordingly, an adsorption composition comprising oxides of copper, zinc and aluminum has been found, the copper-comprising fraction of which has a degree of reduction, expressed as weight ratio of metallic copper to the sum of metallic copper and copper oxides, calculated as CuO, of at most 60%. In addition, processes have been found for removing carbon monoxide from material streams which comprise the use of the adsorption composition of the invention as adsorption composition, but alternatively also use thereof as catalyst of the reaction of carbon monoxide with oxygen or as reaction partner of the carbon monoxide. In particular, a process has been found for removing carbon monoxide from material streams by adsorption which comprise bringing the carbon monoxide-comprising material stream into contact with an adsorption composition which comprises oxides of copper, zinc and aluminum, and comprises its copper-comprising fraction having a degree of reduction, expressed as weight ratio of metallic copper to the sum of metallic copper and copper oxides, calculated as CuO, of at most 60%.

The adsorption composition of the invention is highly suitable for use in processes for purifying material streams, in particular for removing carbon monoxide (CO) from liquid hydrocarbons such as propylene. A particular advantage of the adsorption composition according to the invention is its extraordinarily high adsorption capacity. It is thus particularly outstandingly suitable for freeing from CO material streams having low and constant CO content without duplicate absorber units being necessary.

The degree of reduction is a measure of the oxide content of the copper present in the adsorption composition of the invention. The degree of reduction is determined as weight ratio of metallic copper, that is to say copper in the oxidation state 0 ($Cu^0$) to the sum of metallic copper and copper oxides, calculated as CuO, that is to say copper in oxidation state+2 (degree of reduction [%]=mass of Cu0·100/(mass of Cu0+ mass of CuO)). Pure metallic copper would have a degree of reduction of 100%, pure CuO one of 0%. However, a defined degree of reduction does not necessarily mean that the adsorption composition of the invention comprises metallic copper or CuO. A defined degree of reduction can result from any possible combination of corresponding fractions of metallic copper, $Cu_2O$ or CuO. Pure $Cu_2O$, that is to say copper in oxidation state+1, is formally an equimolar mixture of Cu and CuO and therefore has a degree of reduction of 44.4%. The degree of reduction is determined using any process which is able to determine quantitatively copper in its various oxidation states. However, a particularly simple process is complete oxidation of the copper in a sample of the adsorption composition by contacting it with air at a temperature of at least 250° C. and also at most 500° C. to constant weight which should usually be reached after at least 10 minutes and at most 12 hours. The degree of reduction of the sample is calculated from the weight increase of the sample under the assumption that the additional weight is exclusively oxygen, and assuming a stoichiometry of the oxidation of

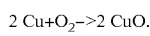

The degree of reduction of the adsorption composition of the invention is finite, that is to say is different from zero. It is typically at least 1%, preferably at least 5%, and in a particularly preferred form at least 10%, and also generally at most 60%, preferably at most 50%, and in a particularly preferred form at most 40%. Examples of suitable degrees of reduction are 15%, 20%, 25%, 30%, or 35%, intermediate values are likewise suitable.

The adsorption composition of the invention acts in the adsorptive process of the invention by adsorption. Adsorption denotes the addition of an adsorbate to the surface of an adsorption composition ("adsorbent"), which is generally reversible by desorption. The adsorbate can also be chemically reacted on the adsorbent, if the adsorbent remains essentially chemically unchanged in this process, one speaks of catalysis (example: the known process for reacting CO with oxygen in the presence of a metallic copper catalyst to give carbon dioxide), if the adsorbate reacts chemically with the adsorbent, one speaks of absorption (examples: the known process for removing oxygen from gas streams by contacting them with metallic copper, forming copper(I) oxide and/or copper(II) oxide; or the known process for removing carbon monoxide from gas streams by contacting them with copper (I) oxide and/or copper(I) oxide, forming carbon dioxide and metallic copper). In the case of pure adsorption and also in the case of catalysis, the adsorbate or its reaction product is removed again from the surface by desorption, in the case of absorption, usually chemical regeneration of the absorbent is necessary. Both in the case of catalysis, and also in the case of absorption, the introductory step is in each case an adsorption, and whether an adsorptive purification process ultimately (for example in the regeneration of the adsorption composition) opens into a catalytic step or an absorptive step or a purely adsorptive process is present, depends on the individual case. In the context of the present invention, "adsorptive" denotes that during the removal of CO from the material stream to be purified, no reaction product of the carbon monoxide is released into the material stream, and the adsorption composition used remains essentially chemically unchanged, that is to say its composition does not change, or changes only insignificantly. Whether during the regeneration of the adsorbent according to the invention, in contrast, carbon monoxide or a reaction product thereof is given off, that is to say catalysis takes place or not, is immaterial for the invention.

Adsorption compositions or absorption compositions are frequently loosely also termed "catalysts", without actually acting catalytically in their specified use.

The adsorption composition of the invention comprises oxides of copper, zinc and aluminum. Copper can also be present in part as metallic copper and is otherwise present in the form of Cu(I) oxide and Cu(II) oxide. In pure form, the adsorption composition of the invention generally comprises copper in an amount which is equivalent, calculated as CuO, to at least 10% by weight, preferably at least 20% by weight, and in a particularly preferred manner at least 30% by weight, and also generally at most 70% by weight, preferably at most 60% by weight, and in a particularly preferred manner at most 50% by weight, copper oxide CuO, in each case based on the total amount of the adsorption composition. The adsorption composition of the invention comprises in pure form generally zinc oxide (ZnO) in an amount of at least 10% by weight, preferably at least 20% by weight, and in a particularly preferred manner at least 30% by weight, and also generally at most 70% by weight, preferably at most 60% by weight, and in a particularly preferred manner at most 50% by weight, in each case based on the total amount of the adsorption composition. It comprises in pure form, in addition, generally aluminum oxide ($Al_2O_3$) in an amount of at least 0.1% by weight, preferably at least 5% by weight, and in a particularly preferred manner, at least 10% by weight, and also generally at most 50% by weight, preferably at most 40% by weight, and in a particularly preferred manner at most 30% by weight, in each case based on the total amount of the adsorption composition. "Pure form", in the context of this invention, denotes that apart from the copper(oxide), zinc oxide and aluminum oxide fractions, no further components are present, apart from insignificant components which are still carried over, for example, from the manufacture, such as excesses of starting materials and reagents, auxiliaries for shaping and the like. "Pure form", therefore denotes that the adsorption composition essentially consists of said components.

The percentage amounts of the components of the adsorption composition always total 100% by weight.

A very highly suitable adsorption composition comprises, in pure form, for example approximately 40% by weight CuO, approximately 40% by weight ZnO and approximately 20% by weight $ZrO_2$, wherein their fractions total 100% by weight.

The components of the adsorption composition can be present in the form of any possible mixed oxide.

The adsorption composition of the invention can, if desired in the individual case, comprise further components, but this is not generally preferred. In particular, the adsorption composition of the invention and the adsorption composition to be used in the process of the invention do not, in a preferred form, comprise zirconium dioxide, except for unavoidable impurities, in particularly preferred form they comprise no zirconium dioxide.

The adsorption composition of the invention can, but need not necessarily, be present in pure form. It is possible to mix it with auxiliaries or to apply it to an inert support. Suitable inert supports are the known catalyst supports such as, for example, aluminum oxide, silicon dioxide, zirconium dioxide, aluminosilicates, clays, zeolites, Kieselgur and the like.

The adsorption composition of the invention is produced just as known oxidic catalysts. A convenient and preferred process for producing the adsorption composition of the invention comprises the following process steps in the sequence stated:

a) production of a solution or suspension of the components of the adsorption composition and/or of starting compounds thereof;
b) precipitation of a solid from this solution by addition of a base, optionally with mixing of the precipitation product with further components of the adsorption composition and/or starting compounds thereof;
c) separation and drying of the solid;
d) calcination of the solid;
e) shaping the solid to give shaped bodies; and
f) further calcination of the shaped bodies;
wherein after or simultaneously with step f) step
g) setting the degree of reduction of the copper-comprising fraction of the adsorption composition, expressed as weight ratio of metallic copper to the sum of metallic copper and copper oxides, calculated as CuO, to a value of at most 60%,
is carried out.

In the first process step, step a), a solution of the components of the adsorption composition is produced in a conventional manner, for example by dissolution in an acid such as nitric acid. Optionally, instead of the components of the adsorption composition their starting compounds are also used, for example the nitrates, carbonates, hydroxycarbonates of the metals dissolved in an aqueous solution, which can also be acidic, for example a nitric acid solution. The quantitative ratio of the salts in the solution is calculated and set stoichiometrically according to the desired final composition of the adsorption composition. It is equally possible to add components in insoluble form, for example aluminum oxide, as finely divided particles, and thus generate and use a suspension in which some components are dissolved and others are suspended.

From this solution, in step b) a solid is precipitated as precursor of the adsorption composition. This proceeds in a conventional manner, preferably by increasing the pH of the solution by adding a base, for instance by adding sodium hydroxide solution or soda solution.

The resultant solid precipitation product, before the drying in step c), is generally separated off from the supernatant solution, for instance by filtering or decanting, and washed free from soluble components such as sodium nitrate with water. It is equally possible to precipitate only some components of the adsorption composition or precursors thereof in this manner and to mix the solid precipitation product with further, for example, insoluble, components, for instance aluminum oxide. It is possible in principle to do this by mixing dried powders, but preferably the mixing proceeds as suspension before separating off and drying the precipitation product.

The precipitation product (if appropriate mixed with further insoluble components) is then usually, before further processing, dried using conventional drying methods. Generally, a treatment at a slightly elevated temperature, for instance about 80° C., preferably at least 100° C., and in a particularly preferred manner at least 120° C., suffices for this, over a period of 10 min to 12 hours, preferably 20 min to 6 hours, and in a particularly preferred manner 30 min to 2 hours. It is also possible, and particularly convenient, to convert the product of the precipitation to a dry further-processable powder directly, a certain alkali metal content, for example sodium content, of the adsorption composition generally does not interfere, or after washing by spray drying.

Subsequently to the drying, the precipitated and dried intermediate product of the adsorption composition is optionally subjected to the calcination step d). The calcination temperature employed in this case is generally at least 350° C., preferably at least 400° C., and in a particularly preferred manner at least 450° C., and also generally at most 650° C., preferably at most 600° C., and in a particularly preferred manner at most 550° C. One example of a highly suitable temperature window for this calcination is the range from 470 to 530° C., that is to say 500±30° C. The calcination time is generally at least 5 minutes, preferably at least 10 minutes, and in a particularly preferred manner at least 20 minutes, and also generally at most 6 hours, preferably at most 2 hours, and in a particularly preferred manner at most 1 hour. One example of a highly suitable range of the residence time for this calcination step is the range from 20 to 30 minutes. The drying step c) and the calcination step d) can overlap with one another.

After the drying step c) or the calcination step d), the adsorption composition or its precursor is processed in the shaping step e) using conventional shaping processes such as rod extrusion, tableting or palletizing to give shaped bodies such as extruded rods or extrudates, tablets, or pellets, including spherical pellets.

After the shaping step, the adsorption composition (that is to say, more precisely its precursor) is subjected to a calcination step f). The calcination temperature employed in this case is generally at least 300° C., preferably at least 350° C., and in a particularly preferred manner at least 400° C., in particular at least 450° C., and also generally at most 700° C., preferably at most 650° C., and in a particularly preferred manner at most 600° C., in particular at most 580° C. One example of a highly suitable temperature window for this calcination step is the range from 490 to 550° C., in particular in the range from 500 to 540° C. The calcination time is generally at least 30 minutes, preferably at least 60 minutes, and also generally at most 10 hours, preferably at most 3 hours, and in a particularly preferred manner at most 2 hours, in particular at most 90 minutes. In a particularly preferred embodiment, the temperature is increased slowly over the calcination time in the range stated.

During the calcination steps, the adsorption composition precursor is converted into the actual adsorption composition and, inter alia, as is customary, also the BET surface area and the pore volume of the adsorption composition are set, wherein, as is known, the BET surface area and the pore volume decrease with increasing calcination time and calcination temperature.

Preferably, calcination is continued overall and at least until the carbonate content of the adsorption composition (calculated as $CO_3^{2-}$) is at most 10% by weight, based on the total weight of the calcination product, and its BET surface area has a value in the range from at least 10 $m^2/g$, preferably at least 30 $m^2/g$, and in a particularly preferred form at least 40 $m^2/g$, in particular at least 50 $m^2/g$, and also generally at most 100 $m^2/g$, preferably at most 90 $m^2/g$, and in a particularly preferred form at most 80 $m^2/g$, in particular at most 75 $m^2/g$. The pore volume of the adsorption composition, measured as water uptake, is set in the calcination to a value of at least 0.05 ml/g. These values are preferred for the adsorption composition according to the invention.

The adsorption composition according to the invention can also, as mentioned above, be deposited on a support. This is performed by conventional impregnation processes or deposition precipitation. A deposition precipitation as is known is a precipitation process in the presence of a support of a support precursor. For carrying out a deposition precipitation, preferably in the above described precipitation process, a support or support precursor is added to the solution produced in step a). If the support is already present in the form of preshaped finished shaped bodies, therefore a pure impregnation process is omitted from shaping step e), otherwise the support is formed in the course of processing the intermediate of the adsorption composition by precipitation, drying, calcination and shaping.

In the production of the adsorption composition, obvious use can be made of known auxiliaries, for instance pore forming agents or tableting aids which decompose in the calcination.

The degree of reduction can be set by setting corresponding process conditions in the calcination (in particular calcination under an atmosphere incompletely oxidizing copper) or it can be set at a separate process step after calcination, wherein, in the latter case, the degree of reduction need not necessarily be set immediately after the calcination. The degree of reduction is set using any known process which is suitable for changing the degree of oxidation of copper. If copper is predominantly present in reduced form, it is reacted with oxygen, if copper is predominantly present as copper oxide, it is reacted with hydrogen.

Usually, the calcination is carried out under air, and copper is therefore present in the form of CuO in the precursor of the adsorption composition of the invention obtained after calcination. The degree of reduction is then set to the desired degree of reduction by reducing the copper. This is performed by treating the precursor present after calcination with a reducing agent. Any known reducing agent can be used which can reduce copper. The exact reaction conditions to be employed depend on the precursor and its composition and also on the reducing agent used and can readily be determined in a few routine experiments. A preferred process is treating the precursor with hydrogen, usually by passing over a hydrogen-comprising gas, preferably a hydrogen/nitrogen mixture, at elevated temperature.

It is equally possible first to reduce the precursor of the adsorption composition of the invention completely and subsequently to oxidize it to the desired degree of reduction. Complete reduction of the precursor of the adsorption composition proceeds via reduction of the copper present in the adsorption composition to copper metal. This can proceed in principle via any reducing agent which can reduce copper from oxidation states I or II to oxidation state 0. This can proceed using liquid or dissolved reducing agents, and in this case drying must be performed after reduction. Therefore, reduction using a gaseous reducing agent is much more convenient, especially reduction using hydrogen by passing a hydrogen-comprising gas over the precursor. The temperature to be employed in this case is generally at least 80° C., preferably at least 100° C., and in a particularly preferred manner at least 120° C., and also generally at most 180° C. is reached, preferably at most 160° C., and in a particularly preferred manner at most 140° C. A suitable temperature is, for example, approximately 130° C. The reduction is exothermic. The amount of recirculated reducing agent must be set in such a manner that the temperature window selected is not left. The course of the activation can be followed on the basis of the temperature measured on the bed of the adsorption medium ("temperature-programmed reduction, TPR").

A preferred method for reducing the precursor of the adsorption composition is, subsequently to drying carried out under a nitrogen stream, to set the desired reduction temperature and to admix to the nitrogen stream a small amount of hydrogen. A suitable gas mixture comprises at the start, for example at least 0.1% by volume hydrogen in nitrogen, preferably at least 0.5% by volume, and in a particularly preferred manner at least 1% by volume, and also at most 10% by volume, preferably at most 8% by volume, and in a particularly preferred manner at most 5% by volume. A suitable value is, for example, 2% by volume. This initial concentration is either retained or elevated in order to attain and maintain the desired temperature window. The reduction is complete when, despite constant or increasing level of the reducing agent, the temperature in the bed of the composition falls. A typical reduction time is generally at least 1 hour, preferably at least 10 hours, and in a particularly preferred manner at least 15 hours, and also generally at most 100 hours, preferably at most 50 hours, and in a particularly preferred manner at most 30 hours.

The precursor of the adsorption composition is dried, if required, by heating the precursor to a temperature of generally at least 100° C., preferably at least 150° C., and in a particularly preferred manner at least 180° C., and also generally at most 300° C., preferably at most 250° C., and in a particularly preferred manner at most 220° C. A suitable drying temperature is, for example approximately 200° C. The precursor is maintained at the drying temperature until interfering residues of adhering moisture are no longer present; this is generally the case with a drying time of at least 10 minutes, preferably at least 30 minutes, and in a particularly preferred manner at least 1 hour, but also in general no more than 100 hours, preferably no more than 10 hours, and in a particularly preferred manner at most 4 hours. Preferably, the drying takes place in a gas stream in order to transport moisture away from the bed. For this, use can be made, for example, of dry air, but particularly preferably an inert gas is to be passed through the bed, suitable gases here are, in particular nitrogen or argon.

After complete reduction, the degree of reduction is set to the desired value by oxidation of the adsorption composition precursor. This can be performed by any known oxidizing agent which can oxidize copper. Relatively conveniently, oxygen is used for this, in particular air or an oxygen/nitrogen or an air/nitrogen mixture, ("lean air"). A preferred method for oxidation of the precursor of the adsorption composition is, after the reduction, to shutoff the hydrogen supply, to flush the residual hydrogen present from the reaction vessel using nitrogen, then to set the desired oxidation temperature and to admix a small amount of oxygen to the nitrogen stream. Temperature, total amount of gas, oxygen content and treatment time must be optimized for the individual case by routine experiments by determining the degree of reduction. A typical suitable gas mixture comprises, for example, at least 0.2% by volume oxygen in nitrogen, preferably at least 0.3% by volume, and in a particularly preferred manner at least 0.4% by volume, and also at most 1.0% by volume, preferably at most 0.9% by volume, and in a particularly preferred manner at most 0.8% by volume. A suitable value is, for example, 0.6% by volume. A typical oxidation time is generally at least 15 minutes hours, preferably at least 30 minutes, and in a particularly preferred manner at least 45 minutes, and also generally at most 2 hours, preferably at most 90 minutes, and in a particularly preferred manner at most 75 minutes. For example, oxidation is performed over one hour. The amount of gas to be employed is typically generally at least 1500 Nl gas per liter of adsorption composition precursor and hour (Nl=standard liter, that is to say based on 0° C. and atmospheric pressure), preferably at least 2000 Nl/l·h and in a particularly preferred manner at least 2300 Nl/l·h, and also generally at most 4000 Nl/l·h, in a preferred form at most 3500 Nl/l·h, and in a particularly preferred form at most 3200 Nl/lh. For example, 2500 Nl/l·h are highly suitable. The temperature set is generally at least 0° C., preferably at least 10° C., and in a particularly preferred form at least 20° C., and also generally at most 60° C., preferably at most 50° C., and in a particularly preferred form at most 40° C. For example, room temperature is highly suitable.

The adsorption composition shaped bodies, for their use, are charged into a container customarily termed "adsorber", occasionally also "reactor", in which they are brought into contact with the material stream to be purified.

The finished adsorption composition, before its use for adsorption of CO, preferably is dried (if appropriate again), in order to remove traces of adhering moisture and to increase the adsorption capacity. The finished adsorption composition is dried in the manner of the above described drying of its precursor.

Conveniently, the setting of the degree of reduction and drying are carried out in the adsorber since otherwise high expenditure is necessary in order to protect the ready-to-use activated adsorption composition from air and moisture when it is charged into the adsorber.

Subsequently to the setting of the degree of reduction, and also to any drying carried out before or after the setting of the degree of reduction, the adsorption composition of the invention is ready to use.

The adsorptive process of the invention is a process for removing carbon monoxide from material streams by adsorption, which comprises contacting the carbon monoxide-comprising material stream with an adsorption composition which comprises oxides of copper, zinc and aluminum, the copper-comprising fraction of which adsorption composition has a degree of reduction, expressed as weight ratio of metallic copper to the sum of metallic copper and copper oxides calculated as CuO of at most 60%. The adsorptive process of the invention also comprises the use of the adsorption composition of the invention. One advantage of the adsorptive process of the invention is its applicability to material streams which are either oxygen-free, are present at a temperature which is not sufficient for conventional catalytic reaction of carbon monoxide with oxygen to give carbon dioxide, or any further use of which, carbon dioxide or oxygenated hydrocarbons interfere.

In principle, using the adsorptive process according to the invention, any material stream can be freed from contamination by carbon monoxide, for example inert gas streams (nitrogen, helium, neon, krypton, xenon and/or argon) or hydrocarbon streams such as, for example, alkanes (methane, ethane, propane, butane, mixtures thereof, isomers and isomeric mixtures) or alkenes (also termed "olefins") such as ethene, propene, 1-butene, 2-butene, 1,3-butadiene and/or styrene.

It is equally possible to use the adsorption composition of the invention for removing carbon monoxide in a non-adsorptive manner. This is advantageous, in particular, when the material stream to be freed from carbon monoxide, in addition to carbon monoxide, also comprises oxygen at a temperature sufficiently high for catalytic reaction of oxygen with carbon monoxide, and in its further use carbon dioxide or oxygenated hydrocarbons do not interfere. For instance, carbon monoxide from material streams comprising carbon monoxide and oxygen can be reacted to form carbon dioxide by catalytic reaction of carbon monoxide with oxygen in the presence of the adsorption composition of the invention used as catalyst and thus removed from the material stream. Likewise, carbon monoxide from carbon monoxide-comprising material streams can be removed from the material stream by reacting carbon monoxide with a copper(I) oxide-comprising and/or copper(II) oxide-comprising adsorption composition of the invention with formation of metallic copper to form carbon dioxide. It is equally possible to remove oxygen from material streams by absorption to the metallic copper-comprising adsorption composition of the invention with formation of copper(I) oxide and/or copper(II) oxide, or in the presence of hydrogen by formation of water catalyzed by the copper. As with other copper-comprising compositions, using the adsorption composition of the invention also, not only carbon monoxide, oxygen and with the latter, also hydrogen, but also other impurities reacting with copper or copper oxide such as, for example, elemental mercury and/or mercury-, sulfur-, antimony- and/or arsenic-comprising compounds can be removed from material streams. In other words: the adsorption composition of the invention can be used in all known processes in which copper-comprising solids are used catalytically, in an absorptive manner, or as reaction partners.

Preferably, the adsorptive process of the invention is used for removing carbon monoxide from alkene streams, in particular for removing carbon monoxide from alkene streams which are customarily present in the liquid state. Alkenes present in the liquid state typically, apart from the use of unusually high pressures, do not have the temperature required for catalytic removal of carbon monoxide by reaction with oxygen, and in addition the formation of oxygenated hydrocarbons would interfere in the subsequent use for polymerization.

The adsorptive process of the invention is particularly suitably used for removing carbon monoxide from propene, 1-butene, 2-butene, 1,3-butadiene, butene mixtures, butene/butadiene mixtures or styrene, in order to decrease the carbon monoxide content to the values permissible for "polymer grade" olefins. In a very particularly preferred embodiment, carbon monoxide is removed from liquid propene by adsorption using the process of the invention.

The adsorptive process of the invention makes possible the removal of carbon monoxide from material streams. It is particularly suitable for removing carbon monoxide from material streams which generally comprise at least 0.001 ppm (in the case of gases ppm by volume, in the case of liquids ppm by weight), preferably at least 0.01 ppm, and also generally at most 1000 ppm, preferably at most 100 ppm, and in a particularly preferred manner at most 10 ppm, of carbon monoxide. For relatively high initial concentrations of carbon monoxide, it is usually more economical to carry out in advance another known purification process such as distillation, catalytic oxidation of the carbon monoxide with oxygen to form carbon dioxide, or oxidation of the carbon monoxide with copper oxide with formation of metallic copper and carbon dioxide, optionally with subsequent removal of carbon dioxide and oxygenated hydrocarbons, since otherwise the adsorption capacity of the adsorption composition can be reached too rapidly.

To carry out the adsorptive process of the invention, the material stream to be freed from carbon monoxide is passed in the adsorber over the bed of the adsorption composition shaped bodies of the invention.

The temperature for the adsorptive process of the invention is not critical, or only slightly critical, from the technical aspect. Typical temperatures are in the range from at least $-270°$ C., preferably at least $-100°$ C., and in a particularly preferred manner $-40°$ C., and also at most $300°$ C., preferably at most $200°$ C., and in a particularly preferred manner at most $100°$ C. Conveniently, the temperature is not influenced separately, but the temperature which the material stream to be treated has is employed.

The essential parameter which determines the degree of depletion is, in addition to the temperature which as described is conveniently not especially influenced, the contact time between material stream and adsorption composition. This contact time is determined by the velocity of the material streams and the volume of the adsorption composition bed. Usually, the volumetric flow rate of the material stream to be purified is predetermined by the capacity of upstream or downstream systems. In addition, the adsorption capacity of the adsorption composition is restricted, so that a certain amount of adsorption composition can only be used for a certain time period for the process of the invention before it must be regenerated. Although this first makes the use of as large an amount of adsorption composition as possible desirable, this is counteracted by the costs increasing with the absorber size. The amount of adsorption composition in the adsorber is therefore selected in the individual case such that firstly the desired degree of depletion, and secondly a tolerably short operating time of an adsorber between two regenerations of the adsorption composition are achieved. Advantageously, at least two adsorbers are provided, of which at least one can be charged with the material stream to be purified, while the adsorption composition is regenerated in at least one other. This is a routine optimization task for those skilled in the art.

Depending on the adsorber size selected, the maximum uptake capacity of the adsorption composition present therein for carbon monoxide is achieved earlier or later, such that it must be regenerated.

For regenerating the adsorption composition of the invention, first the material stream to be purified is shut off, preferably it is passed into a parallel adsorber charged with fresh or regenerated adsorption composition.

The adsorption composition to be regenerated is subsequently regenerated. This is achieved by desorption. It is irrelevant in this case whether, before the desorption, the adsorbed carbon monoxide is exhaustively reacted catalytically with possibly adsorbed oxygen or purely chemically by reaction with copper oxide present in the adsorption composition to form carbon dioxide, or in another manner, for instance to remove any hydrogen present to form methanol or methane, and these reaction products are subsequently desorbed, what is essential is the reestablishment of the adsorption capacity of the adsorption composition.

Desorption is carried out by passing a fluid, preferably a gas, over the adsorption composition, by elevating the temperature, or by a combination of these measures. In a preferred manner, a gas is passed through the adsorber having the adsorption composition to be regenerated and it is heated up in the course of this. The gas can be inert such as, for example, nitrogen, methane or argon, but it is also possible to use hydrogen in this case the CO is reacted to form methanol or methane. The desorption temperature is generally set to a value of at least $50°$ C., preferably at least $100°$ C., and in a particularly preferred manner at least $150°$ C., and also generally at most $500°$ C., preferably at most $450°$ C., and in a particularly preferred manner at most $400°$ C. For example, a desorption temperature of approximately $300°$ C. is suitable. The regeneration time is typically generally at least 1 hour, preferably at least 10 hours, and in a particularly preferred manner at least 15 hours, and also generally at most 100 hours, preferably at most 50 hours, and in a particularly preferred manner at most 30 hours.

To replace oxygen lost from the copper, it is frequently advantageous to carry out the desorption using an inert gas—preference is given to nitrogen or argon—which comprises oxygen in traces. Conveniently, for the desorption, use is made of nitrogen which generally comprises oxygen in an amount of at least 1 ppm, preferably at least 5 ppm, and in a particularly preferred manner at least 10 ppm, and also generally at most 300 ppm, preferably at most 250 ppm, and in a particularly preferred manner at most 200 ppm.

The actual desorption can also be initiated with the removal of residual material stream to be purified from the adsorber by flushing the adsorber, expediently with the gas stream used for the desorption at standard temperature.

Subsequently to this regeneration, the adsorption composition is generally immediately ready for reuse. In the individual case, in particular if the desired degree of reduction has changed too greatly, it can be advisable or necessary to subject the adsorption composition to a renewed setting of the degree of reduction.

By means of the adsorption composition of the invention and the adsorptive process of the invention it is possible to remove carbon monoxide from material streams simply and in an economic manner. The material streams thus purified can subsequently be used as specified.

EXAMPLES

Example 1 (Comparison)

Production of an Adsorption Composition Having Degree of Reduction 0%

A precipitation vessel which is heatable and equipped with an agitator is charged with 8.1 l of water and 672 g of boehmite (PURAL® SB from Condea Chemie Hamburg GmbH, $Al_2O_3$ content around 72% by weight) and heated to 50° C. In the course of half an hour, with stirring, 7.5 l of an aqueous solution of 2980 g of $Cu(NO_3)_2.3\ H_2O$ and 3560 g of $Zn(NO_3)_2.6\ H_2O$ are added. At the same time, a 20% strength by weight sodium carbonate solution was added in such a manner that in a precipitation vessel a pH of 6.2 was maintained. Overall, 13.8 kg of the sodium carbonate solution were consumed for this. The suspension formed was filtered off and washed nitrate free (<25 ppm nitrate in the effluent) with water. The filtercake was dried at 120° C. and subsequently calcined at 500° C. for 25 minutes.

1.7 kg of the resultant material were mixed intensively with 300 g of ammonium nitrate as pore former and 60 g of graphite as tableting aid and shaped to form 3×3 mm tablets. These tablets were calcined at 520° C. for 75 minutes.

Examples 2 and 3 and Comparative Examples 4 and 5

Samples of the tablets obtained in example 1 were reduced by passing over them a gas mixture of 25% by volume hydrogen in nitrogen at 180° C. in a tubular reactor. The reduction times and degrees of reduction set are reported in the table.

Samples of the tablets obtained in (comparative) examples 1 to 5 were charged with a gas mixture of 750 ppm CO in ethylene at 100° C. and ambient pressure (that is to say only the pressure necessary for the gas mixture to pass through the bed is applied upstream of the reactor) in a tubular reactor (adsorber) at a GHSV of 2300 $h^{-1}$. The CO concentration in the exhaust gas is measured continuously and the "breakthrough point" determined, that is to say the ratio of the volume of CO (calculated as pure substance) fed to the adsorption composition per unit volume of the adsorption composition [l of CO/l of adsorption composition] at which 5% of the CO concentration of the gas mixture fed to the adsorber is measured after passage through the adsorber. This breakthrough point is accordingly a measure of the adsorption capacity of the adsorption composition.

The values achieved are listed in the table hereinafter.

| Example | Reduction time [min] | Degree of reduction [%] | Breakthrough point [$I_{CO}$/$I_{adsorption\ composition}$] |
|---|---|---|---|
| 1 (comparison) | — | 0 | 140 |
| 2 | 15 | 22 | 225 |
| 3 | 30 | 32 | 200 |
| 4 (comparison) | 60 | 80 | 115 |
| 5 (comparison) | 120 | 100 | 11 |

The examples show that the adsorption composition of the invention has a very considerably increased adsorption capacity for carbon monoxide compared with previously known adsorption compositions, or adsorption compositions not according to the invention.

The invention claimed is:

1. An adsorption composition comprising oxides of copper, zinc and aluminum,
   wherein copper is present in a copper-comprising fraction selected from the group consisting of metallic copper, $Cu_2O$, and CuO, or a mixture thereof;
   wherein the adsorption composition comprises copper in an amount, calculated as CuO, of from 10% by weight to 70% by weight based on the total amount of the adsorption composition;
   wherein the adsorption composition comprises zinc in an amount, calculated as ZnO, of from 10% by weight to 70% by weight based on the total amount of the adsorption composition;
   wherein the adsorption composition comprises aluminum in an amount, calculated as $Al_2O_3$, of from 0.1% by weight to 50% by weight based on the total amount of the adsorption composition; and
   wherein the copper-comprising fraction has a degree of reduction, expressed as weight ratio of metallic copper to the sum of metallic copper, $Cu_2O$, and CuO, calculated as CuO, of at most 60%; and
   wherein the adsorption composition comprises no zirconium dioxide except for unavoidable impurities.

2. The adsorption composition according to claim 1, wherein the copper-comprising fraction has a degree of reduction, expressed as weight ratio of metallic copper to the sum of metallic copper, $Cu_2O$, and CuO, calculated as CuO, of at most 40%.

3. The adsorption composition according to claim 2 which essentially consists of copper in an amount equivalent to 30% to 50% by weight CuO, zinc in an amount equivalent to 30% to 50% by weight ZnO and aluminum in an amount equivalent to 10% to 30% by weight $Al_2O_3$, in each case based on the total amount of the adsorption composition.

4. The adsorption composition according to claim 1 on an inert support.

5. The adsorption composition according to claim 1, wherein zinc is present in the form of zinc oxide (ZnO) and aluminum in the form of aluminum oxide ($Al_2O_3$).

6. A process for removing carbon monoxide from carbon monoxide-comprising material streams by adsorption to an adsorption composition, wherein the carbon monoxide-comprising material stream is contacted with an adsorption composition defined in claim 1.

7. The process according to claim 6, wherein carbon monoxide is removed from a liquid propylene stream.

8. A process for removing carbon monoxide from carbon monoxide- and oxygen-comprising material streams by catalytic reaction of carbon monoxide with oxygen to form carbon dioxide, wherein the catalyst used is the adsorption composition defined in claim 1.

9. A process for removing carbon monoxide from carbon monoxide-comprising material streams by reacting carbon monoxide with a copper(I) oxide- and/or copper(II) oxide-comprising solid to form carbon dioxide with formation of metallic copper, wherein the adsorption composition defined in claim 1 is used as copper(I) oxide- and/or copper(II) oxide-comprising solid.

10. A process for producing the adsorption composition defined in claim 1, comprising the following process steps in the sequence stated:
a) production of a solution or suspension of the components of the adsorption composition and/or of starting compounds thereof;
b) precipitation of a solid from this solution by addition of a base, optionally with mixing of the precipitation product with further components of the adsorption composition and/or of starting compounds thereof;
c) separation and drying of the resultant solid;
d) calcination of the solid;
e) shaping the solid to give shaped bodies;
f) further calcination of the shaped bodies;
which comprises the process comprising a process step
g) setting the degree of reduction of the copper-comprising fraction of the adsorption composition, expressed as weight ratio of metallic copper to the sum of metallic copper and copper oxides, calculated as CuO, to a value of at most 60%,
to be carried out after or simultaneously with process step f).

11. A process for regenerating the adsorption composition defined in claim 1 after use thereof for removal by adsorption of carbon monoxide from carbon monoxide-comprising material streams, which comprises heating the adsorption composition to a temperature in the range from 50 to 500° C. and/or passing a gas through a bed of the adsorption composition to be regenerated.

12. The adsorption composition according to claim 2 on an inert support.

13. The adsorption composition according to claim 3 on an inert support.

14. The adsorption composition according to claim 2, wherein zinc is present in the form of zinc oxide (ZnO) and aluminum in the form of aluminum oxide ($Al_2O_3$).

15. The adsorption composition according to claim 3, wherein zinc is present in the form of zinc oxide (ZnO) and aluminum in the form of aluminum oxide ($Al_2O_3$).

16. The adsorption composition according to claim 4, wherein zinc is present in the form of zinc oxide (ZnO) and aluminum in the form of aluminum oxide ($Al_2O_3$).

17. A process for removing carbon monoxide from carbon monoxide-comprising material streams by adsorption to an adsorption composition, wherein the carbon monoxide-comprising material stream is contacted with an adsorption composition defined in claim 2.

18. A process for removing carbon monoxide from carbon monoxide-comprising material streams by adsorption to an adsorption composition, wherein the carbon monoxide-comprising material stream is contacted with an adsorption composition defined in claim 3.

19. A process for removing carbon monoxide from carbon monoxide-comprising material streams by adsorption to an adsorption composition, wherein the carbon monoxide-comprising material stream is contacted with an adsorption composition defined in claim 4.

20. A process for removing carbon monoxide from carbon monoxide-comprising material streams by adsorption to an adsorption composition, wherein the carbon monoxide-comprising material stream is contacted with an adsorption composition defined in claim 5.

\* \* \* \* \*